Sept. 28, 1926.

A. T. KASLEY 1,601,073

MOTOR GENERATOR APPARATUS

Filed March 3, 1921

A.T.Kasley
INVENTOR

BY D.C.Davis
ATTORNEY

Patented Sept. 28, 1926.

1,601,073

UNITED STATES PATENT OFFICE.

ALEXANDER T. KASLEY, OF ESSINGTON, PENNSYLVANIA, ASSIGNOR TO WESTINGHOUSE ELECTRIC AND MANUFACTURING COMPANY, A CORPORATION OF PENNSYLVANIA.

MOTOR-GENERATOR APPARATUS.

Application filed March 3, 1921. Serial No. 449,492.

My invention relates to governing mechanism for multiple-motor power plants, more particularly of the marine type, and has for its object to provide apparatus of the character designated which shall insure that the motors develop driving torques bearing substantially a predetermined relative magnitude when operated in conjunction, and which shall furthermore permit the motors to be operated normally independently.

More particularly, my invention is concerned with a power plant employing a plurality of Diesel type, high-compression, or other internal combustion engines. A very satisfactory arrangement is to employ two engines, respectively co-operating to drive the field and armature elements of a generator of the double rotation type, as this form of generator may be made lighter for the same capacity than one having a stator member and the connection thereof with two engines simplifies the installation. With this type of generator, it is desirable that substantially equal torques be applied both to the rotatable armature element and to the rotatable field element. Accordingly, I provide each engine with a governor, together with mechanism whereby each governor is capable of regulating the speed of the engine with which it is associated and at times is capable of cooperating with the other engine so that, when there is a drop in the power of the engine with which the governor is associated, the power of the other engine will be decreased, if necessary. The generator may be connected to any desired motor or motors through appropriate circuits.

Figure 1:
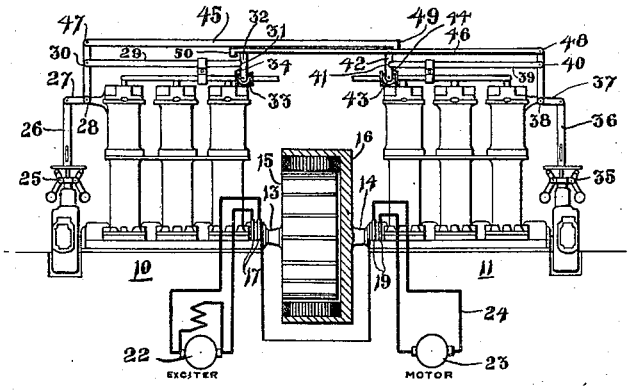
Figure 2:
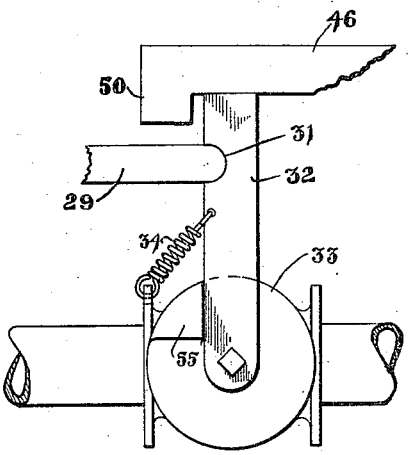

Apparatus embodying features of my invention is illustrated in the accompanying drawings forming a part of this application in which:

Fig. 1 is a side elevation showing the armature element of the generator in section; and Fig. 2 is a detailed view of the valve and its operating elements.

In the drawings, two engines 10 and 11, preferably of the Diesel or other internal-combustion type, are shown with their crank shafts 13 and 14 axially alined.

The generator has the rotatable elements thereof carried by the axially alined crank shafts. As shown, the crank shaft 13 of the engine 10 has mounted thereon a field element 15. The crank shaft 14 of the engine 11 is provided with an armature element 16. Slip rings 17 are mounted on the crank shaft and are connected to the field element and, through brushes, to an appropriate exciter 22. The armature element 16 furnishes current to any appropriate motor 23 through slip rings 19 and a circuit 24 associated therewith.

It is desirable, with a generator of the rotatable field and rotatable armature type having separate engines for the field and armature elements, that the engines apply substantially equal torques to the rotatable generator elements. In practice, due to wear or other causes, the torque developed by one engine may drop below that developed by the other. Accordingly, I provide a governor mechanism for each engine which is capable of controlling its speed and consequently its normal torque; however, should the governor mechanism of one engine be unable to control the engine with which it is associated so as to develop a torque substantially equal to the torque of the other engine, then a connection will be brought into play between the governor and the fuel valve of the other engine so as to throttle or restrict the flow of fuel thereto, thereby diminishing its torque.

Any appropriate means may be used for operating the fuel valves. For example, I show the left hand governor 25 cooperating with a link 26, the latter being pivoted to a bell-crank lever 27, pivoted at 28 to any appropriate part. A link 29 is pivoted at an intermediate point 30 on one arm of the bell-crank and has its other end cooperating with an appropriate seat 31 in the valve lever 32 of the fuel valve 33, normally biased in a counter-clockwise direction to an open position by any appropriate means, for example, a spring 34.

Turning now to the right hand engine 11, a governor 35 is shown adapted to be operated by any convenient part of the engine. The governor cooperates with a link 36, pushing the link up on overspeeds and the link dropping upon underspeeds. The link 36 is pivotally connected to a bell-crank lever 37, the latter being pivoted at 38 and having a link 39 pivotally connected thereto at an intermediate point 40 of one arm. The link 39 cooperates with a seat 41 provided in the fuel valve lever 42 carried by the fuel valve 43, the latter being normally biased to open position by the spring 44. It will be obvious that, should the engine 11 tend to overspeed, the governor will operate through the linkage described to move the fuel valve in a counter-clockwise direction, thereby throttling or restricting the fuel inlet and consequently checking or reducing the speed. In case the engine 11 should slow down, the link 39 is retracted and the spring 44 opens the fuel valve wider.

As heretofore pointed out, I provide means whereby the engines are so controlled as to develop substantially equal torques in order to satisfactorily operate the form of generator shown. This function may be accomplished by interconnecting linkages, whereby, should the torque of one engine drop, its fuel valve is opened wider and wider and finally a limit is reached, whereupon the fuel valve of the other engine is acted upon to diminish its supply of motive fluid, thereby tending to equalize the torques of the engines. The interconnecting mechanisms comprise links 45 and 46 pivoted respectively at 47 and 48 to arms of the bell-crank levers 27 and 37 and having ends 49 and 50 which overhang the upper ends of the fuel-valve levers 42 and 32, respectively. As shown, it is necessary that there should be lost motion between the overhanging ends 49 and 50 and the fuel valve levers 42 and 32 so that the governor of one engine may open its fuel valve up to a certain point before operating through the link 45 or 46 to partially close the fuel valve of the other engine in order to produce equalization of driving torques. In case either of the engines should overspeed, its governor is effective to diminish the supply of motive fluid without affecting the other engine, that is to say, the link 45 or the link 46 would merely slide on top of the fuel-valve lever 42 or 32.

Each of the fuel inlet valves includes an operating lever portion 32 or 42 coacting respectively with the links 29 and 46 and 39 and 45, the levers being biased to an open position by the springs 34 and 44, respectively. As shown in Fig. 2, the fuel-valve lever 32, when in wide open position, abuts against an appropriate abutment 55 carried by the valve casing.

The fuel inlet valves are associated with the fuel supply manifolds for each of the engines, whereby the quantity of motive fluid for all of the cylinders of an engine may be regulated.

Apparatus embodying my invention operates as follows: The engines 10 and 11, connected respectively to the generator elements 15 and 16, rotate in opposite directions. As herein set forth, it is desirable that equal torques be applied to the rotating generator elements and that they rotate at approximately equal speeds, and, in normal operation, each governor mechanism cooperates with its engine to control its speed without affecting the operation of the other engine, acceleration resulting in its fuel inlet valve lever being pushed over by its link to throttle the supply of motive fluid and retardation resulting in a retraction of the link whereupon the spring associated with the fuel inlet valve lever serves to open the inlet valve wider and thereby increase the quantity of fuel supplied.

However, it may happen that the independent governor mechanism will not operate to so control the engines as to develop substantially equal torques. This may result due to wear or any other cause which brings about a drop in torque developed by one of the engines. Assume that the torque developed by the engine 10 commences to drop, immediately the governor responds and operates through the linkage to open wider the fuel valve of the engine 10. The governor causes the fuel valve 33 to be opened wider and wider, the link 29 being retracted, and the spring 34 operating for this purpose. Finally, a position is reached when the over-hanging end 49 of the link 45, associated with the bell-crank 27 connected to the link 29, comes in contact with the end of the fuel inlet valve 42, and movement thereafter results in partial closure or throttling of the fuel inlet valve 43 and the torque developed by the engine 11 is consequently decreased on account of diminished fuel supply.

The governor associated with the engine 11 operates in a similar manner to normally control its speed, and, should there be an abnormal drop in torque, the fuel valve of the engine 10 will then be acted upon in order to diminish its torque.

It will be obvious to those skilled in the art that either alternating or direct current electrical elements may be used. I have shown an alternating current system but I wish it to be understood the principal feature of my invention is concerned with the governing mechanism employed and that any desired type of appropriate electrical elements might be used.

With a marine electric drive installation, it will be obvious that one of the engines might be stopped or braked and the other engine operated. This would result, in the case of an alternating-current system, in reducing the frequency of the generator one-half, or, if a direct-current system is employed, the voltage developed would be reduced one-half. In either event, the operation of the generator would be suitable for cruising speed operation of the motor.

From the foregoing, it will be seen that I have devised a power plant including two engines and a generator of the rotatable field and armature type with governor mechanism associated with each of the engines whereby, under normal operations, the speed and the torque developed by each engine will be independently controlled, and, in case the torque developed by one engine should drop abnormally, its governor mechanism will then become effective to partially close the fuel inlet valve of the other engine, thereby resulting in an installation in which the engines develop substantially equal torques which is desirable with a generator of this type.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. The combination of a plurality of engines, governor mechanism for each engine, a motive fluid valve for each engine, means connecting the governor mechanism of each engine to the motive fluid valve of the same engine, and a direct connection between the governor mechanism of one engine and the motive fluid valve of another engine whereby the valve of the latter engine is actuated to diminish its torque upon a predetermined drop in torque of the first engine.

2. In a power plant installation, the combination of two motors, motive-fluid valves for each of the motors, a governor mechanism for each motor connected to the motive-fluid valve thereof to control the speed thereof, and a lost-motion connection between each governor mechanism and the motive-fluid valve of the other motor whereby, when the power developed by one motor decreases abnormally relatively to the power developed by the other, the inlet valve of the latter is partially closed to equalize the torques.

3. In a power plant installation, the combination of a plurality of engines, valves for controlling the admission of motive fluid to the engines, governor means for each engine for normally controlling the admission valve thereof, and a lost motion connection between the governor means of one engine and an admission valve of another engine whereby, upon an abnormal drop in torque of one engine, the supply of motive fluid for the other engine will be diminished.

4. In a power plant installation, the combination of two engines, a controlling valve for each engine, a governor mechanism for each engine associated with its controlling valve, and means between the governor mechanism of one engine and the valve of the other whereby the latter is moved to throttle the flow of motive-fluid after the other valve is opened a predetermined relative amount.

5. In a power plant installation, the combination of a plurality of engines, valves for the engines, governing mechanisms for the valves operating to secure substantially equal torques developed by the engines, and a lost motion connection between the governor mechanism of one engine and the valve of another engine to secure a decrease in torque of the latter engine upon a relative diminution in power developed by the first engine.

6. In a power plant installation, the combination of two engines, a motive-fluid valve for each of the engines, means constantly tending to open the valves, and a governor mechanism for each engine, including means for closing the valve against the constantly acting means, and means for partially closing the valve of the other engine when the valve for the first engine is opened to a predetermined extent.

7. In a power plant installation, the combination of two engines, motive-fluid valves for the engines, governor mechanism for the motive fluid valve of each of the engines, and operative connections between each governor and the two motive-fluid valves whereby when one governor moves its associated motive fluid valve in an opening direction a predetermined amount the other valve will be moved in a closing direction.

8. In a power plant installation, the combination of two engines, motive-fluid valves for the engines, levers for the valves, springs associated with levers for normally biasing the valves to open position, governors for the engines, and a lever mechanism for each governor and including links cooperating with the valve levers whereby when the lever mechanism moves in one direction one valve is moved in a closing direction and when the lever mechanism moves in the other direction a predetermined amount the other valve is moved in a closing direction.

In testimony whereof, I have hereunto subscribed my name this 28th day of February, 1921.

ALEXANDER T. KASLEY.